US006299441B1

(12) United States Patent
Novak

(10) Patent No.: US 6,299,441 B1
(45) Date of Patent: Oct. 9, 2001

(54) CHEMILUMINESCENT MOUTHPIECE

(75) Inventor: Craig Novak, Kennett Square, PA (US)

(73) Assignee: Unique Industries, Inc., Philadelphia, PA (US)

( * ) Notice: Subject to any disclaimer, the term of this patent is extended or adjusted under 35 U.S.C. 154(b) by 0 days.

(21) Appl. No.: 09/609,277

(22) Filed: Jul. 5, 2000

(51) Int. Cl.[7] ...................... A61C 1/00

(52) U.S. Cl. ...................... 433/29; 362/34; 362/84; 128/861

(58) Field of Search ...................... 362/34, 84, 253; 433/29, 6; 128/859, 861, 862

(56) References Cited

U.S. PATENT DOCUMENTS 3,539,794 11/1970 Rauhut .
3,764,796 10/1973 Gilliam .
4,553,936 * 11/1985 Wang ...................... 433/37
5,007,924 4/1991 Jekel .
5,063,483 11/1991 Feilmeier .
5,083,770 1/1992 Holland .
5,171,081 12/1992 Pita .
5,277,173 * 1/1994 Cantele .
5,316,473 * 5/1994 Hare ...................... 433/29
5,430,622 * 7/1995 Kuo ...................... 362/34
5,692,895 * 12/1997 Farzin-Nia et al. ...................... 433/8
5,718,577 2/1998 Gyman et al. .
6,068,475 * 5/2000 Stoyka, Jr. ...................... 433/80
6,244,269 * 6/2001 Tyler ...................... 128/859

OTHER PUBLICATIONS

Glow Mouth Monster Collegeville/Imagineering L.P. 1992.

* cited by examiner

*Primary Examiner*—Ralph A. Lewis
(74) *Attorney, Agent, or Firm*—Gerard F. Dunne

(57) ABSTRACT

A novelty product includes a holder to be held inside the mouth of a user and a carrier to be held removably by the holder and having a first compartment containing a chemiluminescent solution separated from a second compartment containing an activator for the chemiluminescent solution by a frangible barrier. The carrier may be inserted into the holder and the holder flexed to break the barrier and mix the chemiluminescent solution and activator to produce chemiluminescent light inside the mouth of a user. The carrier can be replaced upon the light produced diminishing.

18 Claims, 2 Drawing Sheets

CHEMILUMINESCENT MOUTHPIECE

FIELD OF THE INVENTION

The present invention relates to novelty products, particularly a product which may emit chemiluminescent light inside the mouth of a user.

BACKGROUND OF THE INVENTION

A novelty product is known which can be placed into the mouth of a user in the manner of a mouthpiece and carries chemicals for producing chemiluminescent light upon activation. This product can thus provide a "glow" effect inside the mouth of a user. Typically, chemiluminescent products require an oxalate solution containing a fluorescent dye, and an activator solution held separately from the oxalate solution. In order to provide chemiluminescence, the activator and the oxalate solution must be mixed; and chemiluminescence will result. However, the chemiluminescence will eventually fade.

In the known product, the mouthpiece has the oxalate solution containing a fluorescent dye and an activator sealed internally, and thus it is necessary to replace the entire mouthpiece when the chemiluminescence eventually fades.

It is an object of the present invention to provide a chemiluminescent novelty product for insertion into the mouth of the user which has a replaceable carrier for the chemiluminescent solutions and activator so the carrier may be replaced as the chemiluminescence eventually fades.

According to the present invention, a novelty product for providing chemiluminescent light inside the mouth of a user includes a holder adapted to be held removably inside the mouth of a user, and one or more compartmented carriers. The carriers are each adapted to be held removably by said holder and have a first compartment containing a chemiluminescent solution separated from a second compartment containing an activator for the chemiluminescent solution by a frangible barrier. In this way, a carrier may be inserted into the holder and the holder flexed to break the barrier and mix the chemiluminescent solution and activator to produce chemiluminescent light, and the carrier can be replaced easily upon the light produced diminishing.

Preferably, the holder has a palate portion adapted to underlie the roof of the user's mouth behind the front teeth, and a channel for the carrier extends longitudinally from an exterior opening at a location adapted to lie behind the front teeth of the user to an inner opening of reduced size. In this way, a carrier can be inserted into the exterior opening but prevented from exiting the channel by the smaller opening during use. The holder may have wing portions adapted to engage the lateral teeth of the user.

These and other objects, and advantages and features of the present invention will become apparent from the description given below which is made in conjunction with the following drawing figures.

Figure 1:
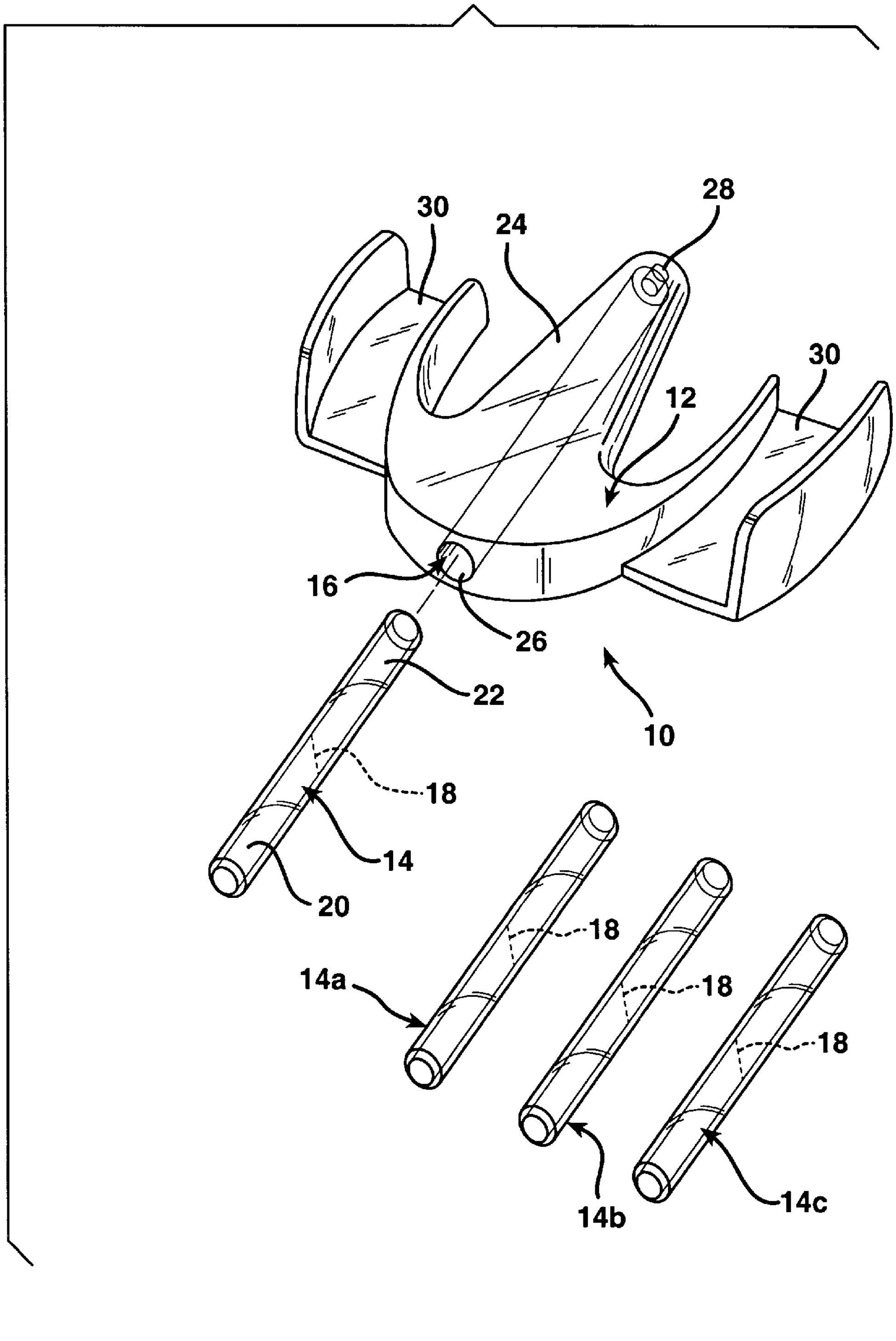
FIG. 1 is an exploded view of novelty product according to the present invention.
Figure 2:
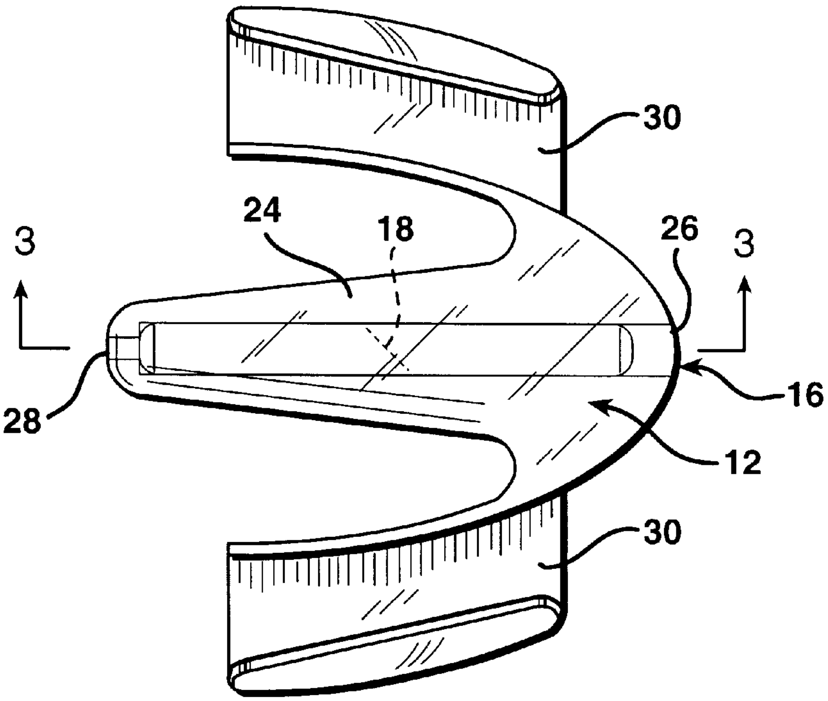
FIG. 2 is a top view thereof in elevation.
Figure 3:
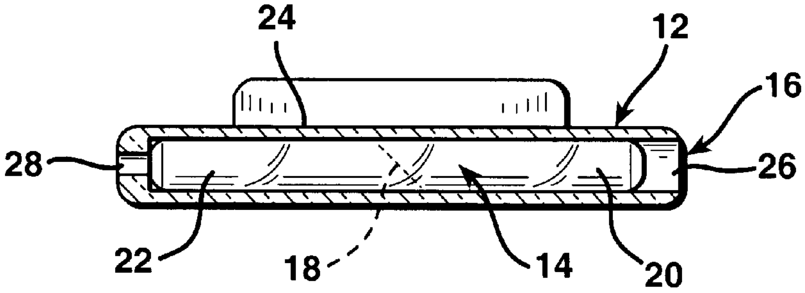
FIG. 3 is a sectional view through line 3—3 of FIG. 2.

As illustrated in FIG. 1, a novelty product 10 of the present invention includes a holder 12 formed preferably of a transparent or translucent food-grade plastics material. A carrier 14 is dimensioned to be inserted removably within a longitudinal channel 16 of the holder and has a first compartment containing a chemiluminescent solution separated from a second compartment containing an activator for the chemiluminescent solution by a frangible barrier.

The carrier 14 is formed of a flexible synthetic plastics material; and as understood in the chemiluminescent art, the carrier contains an oxalate solution including a fluorescent dye to emit chemiluminescent light when mixed with an activator. A frangible barrier 18 forms separate compartments 20 and 22 containing the oxalate solution and the activator solution; and the frangible barrier is such that it will rupture upon bending of the carrier 14 to allow the oxalate solution and activator solution to mix to emit chemiluminescent light, as is well understood in the art.

The holder 12 is sufficiently flexible so that the carrier 14 may be slid into the channel 16 and the holder flexed to rupture the barrier 18 and permit the chemiluminescent solution to mix with the activator and emit chemiluminescent light. In this way, the interior of a user's mouth can appear to glow upon insertion of the holder in the manner of a mouthpiece. Additional carriers 14*a*, 14*b* and 14*c* may be provided to serve as replacements when the chemiluminescence of the carrier within the holder 12 diminishes below an accepted value.

The holder 12 has a palate portion 24 adapted to underlie the roof of the user's mouth behind the front teeth. The channel 16 extends longitudinally from an exterior opening 26 at a location adapted to lie behind the teeth of the user to an inner opening 28 of reduced size. In this way, the carrier 14 can be inserted into the exterior opening 26 that will lie behind the teeth of the user but prevented from exiting the channel as a result of the smaller opening 28 being less in diameter than the diameter of the carrier 14.

The holder additional has wing portions 30 adapted to engage the lateral teeth of the user. As can be understood, the novelty product will function as a mouthpiece to provide chemiluminescent light from the user's mouth, and the carrier 14 in the form of a tube can be replaced as the chemiluminescent light diminishes. Yet, the carrier 14 will be held safely and securely in the channel 16 to prevent accidental ingestion.

To replace a carrier, the end of a paper clip, toothpick or similar device can be inserted into the small opening 28 to force the carrier in the channel outwardly through opening 26.

These and other objects, advantages and features of the present invention will be understood from the detailed description made above; and it is understood that the present invention is not limited by any other details set forth above, but by the appended claims.

What is claimed is:

1. A novelty product for providing chemiluminescent light inside the mouth of a user, including a holder adapted to be held inside the mouth of a user, and a compartmented carrier adapted to be held removably by said holder and having a first compartment containing a chemiluminescent solution separated from a second compartment containing an activator for said chemiluminescent solution, said holder having structures adapted to receive said carrier in a manner permitting the user to remove said carrier and replace with another carrier within said holder.

2. A novelty product as set forth in claim 1, said holder being capable of transmitting light and having an interior channel receiving said carrier.

3. A novelty product as set forth in claim 2, said carrier being a tube adapted to be inserted into said channel and having a frangible barrier to separate said compartments, said holder being flexible whereby said carrier can be inserted into said channel and said holder flexed to break said barrier and mix said chemiluminescent solution and activator upon shaking by the user.

4. A novelty product as set forth in claim 3, said holder having a palate portion adapted to underlie the roof of the user's mouth behind the front teeth, said channel extending longitudinally from an exterior opening at a location adapted to lie behind the front teeth of the user to an inner opening of reduced size to enable said carrier to be inserted into said exterior opening but prevented from exiting said channel through said smaller opening.

5. A novelty product as set forth in claim 4, said holder having wing portions adapted to engage lateral teeth of the user.

6. A novelty product as set forth in claim 3, said holder having wing portions adapted to engage lateral teeth of the user.

7. A novelty product as set forth in claim 1, said carrier being a tube adapted to be inserted slidably into a channel formed in said holder and having a frangible barrier to separate said compartments.

8. A novelty product as set forth in claim 7, said holder being flexible whereby said carrier can be inserted into said channel and said holder flexed to break said barrier and mix said chemiluminescent solution and activator upon shaking by the user.

9. A novelty product as set forth in claim 7, said holder having a palate portion adapted to underlie the roof of the user's mouth behind the front teeth, said channel extending longitudinally from an exterior opening at a location adapted to lie behind the teeth of the user to an inner opening of reduced size to enable said carrier to be inserted into said exterior opening but prevented from exiting said channel through said smaller opening.

10. A novelty product as set forth in claim 9, said holder having wing portions adapted to engage lateral teeth of the user.

11. A novelty product as set forth in claim 1, said holder being capable of transmitting light and having an interior channel adapted to receive said carrier slidably.

12. A novelty product for providing chemiluminescent light inside the mouth of a user, including a holder having a palate portion adapted to underlie the roof of the user's mouth behind the front teeth, and a compartmented carrier adapted to be held slidably in a channel formed within said holder and having a first compartment containing a chemiluminescent solution separated from a second compartment containing an activator for said chemiluminescent solution, said channel extending longitudinally from an exterior opening at a location adapted to lie behind the front teeth of the user.

13. A novelty product as set forth in claim 12, said channel extending to an inner opening of a size smaller than said carrier to enable said carrier to be inserted into said exterior opening but prevented from exiting said channel through said inner opening.

14. A novelty product as set forth in claim 13, said holder having wing portions adapted to engage lateral teeth of the user.

15. A novelty product for providing chemiluminescent light inside the mouth of a user, including a holder adapted to be held removably inside the mouth of a user, and a plurality of compartmented carriers each adapted to be held removably by said holder and having a first compartment containing a chemiluminescent solution separated from a second compartment containing an activator for said chemiluminescent solution by a frangible barrier whereby a carrier may be inserted into said holder and said holder flexed to break said barrier and mix said chemiluminescent solution and activator to produce chemiluminescent light, said holder having structures adapted to receive each respective carrier individually in a manner permitting the user to remove said carrier and replace with another carrier within said holder, whereby said carrier can be replaced upon the light produced diminishing.

16. A novelty product as set forth in claim 15, said holder being capable of transmitting light and having an interior channel receiving said carrier.

17. A novelty product as set forth in claim 16, said holder having a palate portion adapted to underlie the roof of the user's mouth behind the front teeth, said channel extending longitudinally from an exterior opening at a location adapted to lie behind the teeth of the user to an inner opening of reduced size to enable a carrier to be inserted into said exterior opening but prevented from exiting said channel through said smaller opening.

18. A novelty product as set forth in claim 17, said holder having wing portions adapted to engage lateral teeth of the user.

* * * * *